US 11,866,211 B2

(12) United States Patent
Niederbacher et al.

(10) Patent No.: US 11,866,211 B2
(45) Date of Patent: Jan. 9, 2024

(54) HANDLING DEVICE AND METHOD FOR HANDLING WEB-SHAPED PACKAGING MATERIAL

(71) Applicant: Uhlmann Pac-Systeme Gmbh & Co. KG, Laupheim (DE)

(72) Inventors: Yannick Niederbacher, Schwendi/Bussmannshausen (DE); Sebastian Scharpf, Illerkirchberg (DE)

(73) Assignee: UHLMANN PAC-SYSTEME GMBH & CO. KG, Laupheim (DE)

( * ) Notice: Subject to any disclaimer, the term of this patent is extended or adjusted under 35 U.S.C. 154(b) by 31 days.

(21) Appl. No.: 17/512,274

(22) Filed: Oct. 27, 2021

(65) Prior Publication Data

US 2022/0153461 A1 May 19, 2022

(30) Foreign Application Priority Data

Nov. 16, 2020 (EP) ..................................... 20207738

(51) Int. Cl.
*B65B 41/06* (2006.01)
*B25J 15/06* (2006.01)

(52) U.S. Cl.
CPC ........... *B65B 41/06* (2013.01); *B25J 15/0616* (2013.01)

(58) Field of Classification Search
CPC . B25J 15/007; B25J 15/02; B25J 15/06; B25J 15/0616
See application file for complete search history.

(56) References Cited

U.S. PATENT DOCUMENTS

| 5,156,387 A | 10/1992 | Seto |
| 10,526,157 B2 | 1/2020 | Buchko, Jr. et al. |
| 2014/0147239 A1* | 5/2014 | Miyoshi ............... B25J 15/0616 414/815 |
| 2015/0212508 A1* | 7/2015 | Miyoshi .................... B26F 1/38 700/160 |
| 2016/0178536 A1 | 6/2016 | Kinoshita et al. |
| 2019/0112082 A1* | 4/2019 | Marx ...................... B65B 43/54 |

FOREIGN PATENT DOCUMENTS

| DE | 19817174 A1 | 11/1998 |
| DE | 10017347 A1 | 10/2001 |
| EP | 0270109 A2 | 6/1988 |
| EP | 2735407 A2 | 5/2014 |
| JP | H06308246 A | 11/1994 |
| JP | 5170548 B2 | 2/2010 |
| KR | 1020160040454 | 4/2016 |
| WO | 0174696 A2 | 10/2001 |

OTHER PUBLICATIONS

European Search Report dated May 3, 2021.

* cited by examiner

*Primary Examiner* — Saul Rodriguez
*Assistant Examiner* — Brendan P Tighe
(74) *Attorney, Agent, or Firm* — Dickinson Wright PLLC (57) ABSTRACT

A handling device having a holder for gripping web-shaped packaging material, which holder has a curvature in the longitudinal direction of the holder. When the packaging material is gripped by the handling device, a free end section of the packaging material is arched in the transverse direction of the packaging material and projects out from the handling device to be inserted into a processing station of a packaging machine.

14 Claims, 5 Drawing Sheets

HANDLING DEVICE AND METHOD FOR HANDLING WEB-SHAPED PACKAGING MATERIAL

CROSS-REFERENCE TO RELATED APPLICATIONS

This application claims the benefit of priority under 35 U.S.C. § 119 to European Patent Application No. 20 207 738.4, filed Nov. 16, 2020, the contents of which is incorporated herein by reference in their entirety.

FIELD

The present disclosure relates to a handling device and to a method for handling web-shaped packaging material, especially for inserting the web-shaped packaging material into a packaging machine. The disclosure also relates to a packaging machine with a handling device of this type.

BACKGROUND

A web of non-rigid packaging material such as a film web often passes through a plurality of processing stations in a packaging machine. The packaging material is processed in these stations, where products are loaded into the packaging material or packaged by the packaging material. If the packaging machine is, for example, a blister pack machine, a forming film web is guided through, for example, a forming station in the machine for forming the blister pockets, through a filling station for filling the blister pockets with medicinal or pharmaceutical products, and through a sealing station for sealing a lidding film web onto the formed film web.

At the beginning of the production process, the non-rigid, web-shaped packaging material must be inserted into the packaging machine. Before it is possible for processing to begin, the packaging material must be threaded through the processing stations and around various guide and deflection elements along a predetermined path. Because of the difficulty of handling the sensitive, non-rigid packaging material and the tight spaces in the packaging machine, this process is very complicated and is carried out manually.

SUMMARY

It is an object of the present disclosure to provide a handling device and a method which make it possible to handle web-shaped packaging material securely and reliably and which simplify the insertion of the packaging material into a packaging machine.

According to an aspect of the disclosure, the handling device for handling non-rigid web-shaped packaging material comprises a holder, which is configured to grip the web-shaped packaging material. The holder extends farther in a longitudinal direction than in the transverse directions perpendicular to the longitudinal direction of the holder and comprises a contact area, which is defined by at least one contact site for contacting the web-shaped packaging material. The contact area comprises a curvature extending in the longitudinal direction of the holder.

As a result of the curvature of the holder in the contact area, the packaging material gripped by the holder becomes arched in a transverse direction of the web-shaped packaging material, wherein a tensile force and a resulting tension can be generated in turn in the packaging material. This arching of the packaging material and the tensile force and tension in the packaging material give the packaging material a certain stability and stiffness. As a result of this effect, when the free end section of the packaging material is now gripped by the holder, the end section projects out from the holder in the longitudinal direction of the packaging material. The projecting end section of the packaging material can then be easily introduced by means of the handling device into a processing station of a packaging machine, regardless of how the station may be oriented.

That the free end section of the web-shaped packaging material projects from the holder means that, in a (cross-sectional) view perpendicular to the longitudinal direction of the holder, the web-shaped packaging material extends from the contact area up to a leading free edge of the end section, which edge is parallel or tangential to the at least one contact site. In particular, the web-shaped packaging material comprises no kinks or curves in the longitudinal direction of the web-shaped packaging material between the contact area and the leading edge but rather extends in a straight line. In other words, the free end section of the web-shaped packaging material does not hang down from the holder by the force of gravity. Thus the free end section always comprises a defined orientation relative to the holder independently of the orientation of the holder and can be effectively guided through the packaging machine and introduced into a processing station.

Because the handling device makes it possible to introduce the web-shaped packaging material into a processing station of the packaging machine, it is possible to realize a (partial) automation of the insertion of the non-rigid, web-shaped packaging material into the packaging machine. For example, a robot can be provided for this purpose, which carries the handling device and moves along the packaging machine and its processing stations.

The holder is therefore preferably configured to take advantage of the curvature of the contact area to generate a tensile force in the packaging material along the curvature in a transverse direction of the packaging material, this transverse direction being perpendicular to the longitudinal direction of the packaging material.

The contact area of the holder is configured to contact the web-shaped packaging material gripped by the holder. The contact area preferably comprises all of the contact sites of the holder for the packaging material. The at least one contact site can be configured for 2-dimensional, linear, or point-like contact, depending on the configuration of the holder. It is obvious that, in the case of point contact, it will be necessary to provide a plurality of contact sites to define the curvature.

If the holder comprises exactly one contact site, this defines the contact area and the curvature. This can be the case when the contact site comprises a 2-dimensional or linear contact with the packaging material extending at least partially in the longitudinal direction of the holder.

If the holder comprises a plurality of contact sites, the contact area is defined by the plurality of contact sites and the connection between them at least in the longitudinal direction of the holder. Consequently, the plurality of contact sites forms the contact area and thus defines the curvature. The contact sites of the plurality of contact sites lie preferably on a curved line of the curvature of the contact area. The contact area preferably extends in the longitudinal direction from a first contact of the holder with the packaging material to a last contact of the holder with the packaging material.

The curvature preferably extends over the entire contact area in the longitudinal direction of the holder. That is, the entire contact area, which preferably comprises all of the contact sites, is curved in the longitudinal direction. As a result, there are no other contact sites which could deflect the packaging material and counteract the desired effect by decreasing the stability of the end section of the packaging material.

In a cross-sectional view parallel to the longitudinal direction of the holder and perpendicular to a transverse direction of the holder, which is parallel to the longitudinal direction of the packaging material, the curvature of the contact area is represented or projected as a curved line. The curved line is therefore characteristic of the curvature of the contact area.

In a preferred embodiment, the curvature of the contact area is defined by a quadratic function. In this case, the curve of the curvature or, in the cross-sectional view, the curved line, comprises the equation of a quadratic function and thus follows a quadratic course. The curve of the curvature of the curved line, however, can also be a segment of a circle with a constant radius of curvature.

The curvature preferably has a radius of curvature which is between 1 mm and 10,000 mm, preferably between 1,000 mm and 3,000 mm, and more preferably between 2,200 mm and 2,400 mm.

A length of the holder is defined in the longitudinal direction of the holder. The holder also comprises a height, which, in a first transverse direction, is perpendicular to the longitudinal direction of the holder; the holder also has a width, which is perpendicular in a second transverse direction to the longitudinal direction of the holder and perpendicular to the first transverse direction. When the holder grips a web-shaped packaging material, the length of the holder is preferably parallel to the transverse direction of the packaging material; the width of the holder is preferably parallel to the longitudinal direction of the packaging material; and the height is perpendicular to a top surface of the packaging material.

To take into proper account the tight spaces in a packaging machine and to make it possible to move the web-shaped packaging material as needed along with the holder through a processing station of the packaging machine, it is advantageous to minimize the width and the height of the holder.

The width of the holder is preferably between 1 mm and 100 mm, more preferably between 1 mm and 50 mm, and even more preferably between 1 mm and 30 mm.

The height of the holder is preferably between 1 mm and 100 mm, more preferably between 1 mm and 50 mm and even more preferably between 1 mm and 25 mm.

The length of the holder is preferably between 1 mm and 3,000 mm, more preferably between 100 mm and 1,000 mm, and even more preferably between 200 mm and 400 mm.

For the range of values for the width, height, and length of the holder and equally for all of the other value ranges given herein, it is to be understood that they encompass all of the values present between these ranges and in particular also any desired subranges, wherein the stated lower and upper limits can be selected from the ranges independently of each other, in particular in whole numbers of mm.

The longer the holder is, the greater the distance over which the curved contact area can extend in the longitudinal direction of the holder and thus in the transverse direction of the web-shaped package material. If the length of the holder and thus the length of the curved contact area are increased, the part of the packaging material which becomes arched is also increased, so that the end section of the packaging material gripped by the holder acquires greater stability.

In a preferred embodiment, the holder is configured as a suction unit. A suction unit is especially well suited to the handling of sensitive packaging materials such as films; it can be easily activated and deactivated to grip or release the packaging material; and it can be configured in a space-saving manner.

The suction unit can comprise a suction tube, in the lateral surface of which a plurality of bores are provided, wherein the bores are preferably arranged one after the other in the longitudinal direction of the holder. In the interior of the suction tube, a vacuum line is preferably formed, which is in fluidic connection at one end with the plurality of bores in the lateral surface of the suction tube and connected at the other end to a source of negative pressure such as a vacuum pump. The vacuum line is preferably parallel to the longitudinal direction of the holder.

The suction unit can comprise a plurality of suction cups, wherein the suction cups are preferably arranged one after the other in the longitudinal direction of the holder. The suction cups can be actuatable independently of each other individually or in groups, in that, for example, each one is in fluidic connection by means of its own separate vacuum line to a source of negative pressure such as a vacuum pump. The suction cups can be attached to a body of the suction unit. The suction cups, however, can also be provided on a suction tube, as previously described, and each one can be in fluidic connection with the source of negative pressure via of one of the plurality of bores.

In an alternative embodiment, the holder can also be configured as a clamping unit, which, for example, comprises a clamping bar defining the curvature of the contact area and at least one backing element against which the clamping bar can clamp the packaging material. The backing element can, for example, be configured as a second clamping bar with a complementary curvature.

It is also conceivable that the holder could be configured to grip the packaging material in the contact area by electrostatic means or to be given adhesive properties in the contact are in order to grip the packaging material.

So that the holder can be put to use with the greatest possible flexibility and so that it can introduce the web-shaped packaging material with any desired orientation into the individual processing stations, it can be movably supported. The holder is preferably rotatably supported around its longitudinal axis or an axis parallel to its longitudinal axis and also supported so that it can be moved horizontally and vertically.

The handling device preferably comprises a coupling for connecting the handling device to a manipulator such as a (multi-axial) robot.

According to another aspect of the disclosure, a packaging machine comprises the non-rigid, web-shaped packaging material, in particular a forming film web or a lidding film web, which has a longitudinal direction; a first processing station for processing the web-shaped packaging material in the packaging machine; and a handling device as described above for introducing the free end section of the web-shaped packaging material into the first processing station.

As a result, the object is achieved that the web-shaped packaging material can be inserted as easily as possible and in an (at least partially) automated manner into the packaging machine.

All of the features of the handling device described here therefore apply analogously to a packaging machine comprising the handling device. Features of the handling device which are described in conjunction with the packaging machine are also transferable analogously to the handling device by itself.

The packaging machine is preferably configured as a blister pack machine. For its own part, the blister pack machine is configured to produce blister packs and to fill the blister packs with medicinal or pharmaceutical products.

The non-rigid, web-shaped packaging material is preferably a forming film web or a lidding film web. The features of the web-shaped packaging material described here can therefore be transferred analogously to any other desired web-shaped packaging materials.

For example, the packaging machine comprises an additional non-rigid, web-shaped packaging material, wherein the one web-shaped packaging material can be a forming film web and the other web-shaped packaging material can be a lidding film web. It is then possible to insert both the forming film web and the lidding film web into the packaging machine by means of the handling device.

The non-rigid, web-shaped packaging material is preferably provided on a supply roll in the packaging machine. The supply roll is provided on the feed side, i.e., in an entrance area of the packaging machine. The web-shaped packaging material is to be guided through the packaging machine from the supply roll along a predefined path, that is, guided in particular at least through the first processing station and around guide and deflector elements. During the insertion step, the web-shaped packaging material is unrolled from the supply roll.

The packaging machine preferably comprises a plurality of processing stations, which comprise the first processing station and at least one second processing station. Regardless of whether the packaging machine comprises only the first processing station or a plurality of processing stations, each processing station of the packaging machine is preferably selected from a cutting device, an adhesive bonding device, a feed device, a heating device, a forming device, a sealing device, a stamping device, an embossing device, and a grooving device.

The designation "first processing station" is selected merely to differentiate it from other possible processing stations and does not necessarily refer to a sequence of several processing stations, nor does it imply that additional processing stations must be present. The first processing station can be any desired processing station of the packaging machine into which the web-shaped packaging material is to be introduced by means of the handling device.

If the packaging machine comprises a plurality of processing stations, the handling device is preferably configured to introduce the free end section of the web-shaped packaging material into each processing station of the plurality of processing stations. All of the features described herein with respect to the first processing station and the introduction of the web-shaped packaging material into the processing station apply analogously to each processing station of the plurality of processing stations. As a result, the process of inserting the web-shaped packaging material into the packaging machine can be completely automated.

It is obvious that the web-shaped packaging material can also be introduced by means of the handling device into only one processing station or into any desired subgroup of the plurality of processing stations.

To introduce the free end section of the web-shaped packaging material at least into the first processing station, the holder engages at least temporarily with the end section of the web-shaped packaging material, wherein the longitudinal direction of the holder is arranged so that it is perpendicular to the longitudinal direction of the web-shaped packaging material, i.e., parallel to the transverse direction of the web-shaped packaging material. As a result, the curvature of the contact area of the holder brings about an arching of the web-shaped packaging material in the transverse direction of the web-shaped packaging material. The free end section of the web-shaped packaging material can then project out in the longitudinal direction of the web-shaped packaging material from the holder so that it can be easily introduced into the first processing station.

After the handling device has guided the free end section of the web-shaped packaging material up to the first processing station and inserted it into this station, it can be necessary for it to release the free end section; the holder will grip the free end section again only after the end section has emerged downstream from the first processing station. The holder is thus not permanently engaged with the end section of the web-shaped packaging material but rather only temporarily. Other embodiments are also conceivable, however, in which the holder is guided along with the free end section of the packaging material through the processing station, so that it is not necessary for the holder to release the end section.

In a preferred embodiment, the contact area of the holder extends in its longitudinal direction over at least 30%, more preferably over at least 60%, and even more preferably over 100% of the width of the web-shaped packaging material in the transverse direction of the web-shaped packaging material.

As defined above, the contact area can extend over no more than 100% of the width of the web-shaped packaging material. In combination with the curvature of the contact area, this measure is especially advantageous for the purpose of giving the web-shaped packaging material an arch-like shape over the entire width of the material.

It is obvious that the holder can also extend in its longitudinal direction over more than the width of the web-shaped packaging material. So that the holder can be moved through the packaging machine with the least possible hindrance, its length in the longitudinal direction, however, is preferably less than the width of the web-shaped packaging material. Depending on the processing station and the configuration of the packaging machine, however, it can be advantageous for the contact area and the holder to extend in the longitudinal direction of the holder over less than the width of the web-shaped packaging material, so that a lateral overhang of the packaging material beyond the contact area and/or the holder in the transverse direction of the packaging material is obtained.

Once the holder is engaged with the end section of the web-shaped packaging material, the distance between the leading edge of the web-shaped packaging material and the holder and/or the contact area of the holder is preferably between 0 mm and 200 mm, more preferably between 5 mm and 100 mm, even more preferably between 40 mm and 60 mm. The distance is defined parallel to the longitudinal direction of the web-shaped packaging material and perpendicular to the leading edge of the web-shaped packaging material.

The greater the distance between the leading edge of the web-shaped packaging material and the holder and/or the contact area, the greater the overhang of the free end section of the web-shaped packaging material beyond the holder and the farther the handling device can introduce the web-shaped packaging material into the first processing station.

As this distance increases, however, the intrinsic weight of the overhanging, free end section of the web-shaped packaging material also increases, and it is then necessary to increase the tensile force in the transverse direction of the packaging material and thus the curvature of the contact area in order to achieve the necessary stability of the free end section and thus the projection of the end section from the holder.

In an especially preferred embodiment, the packaging machine also comprises a robot, as previously mentioned, on which the handling device is supported and which is configured so that the handling device can introduce the end section of the web-shaped packaging material into the first processing station. As a result, the process of inserting the web-shaped packaging material into the packaging machine can be at least partially automated.

The handling device is preferably connected detachably to the robot, so that it can be easily replaced. As a result, the handling device can be exchanged for a different handling device or for a different tool adapted to a different web-shaped packaging material.

If the packaging machine comprises a plurality of processing stations with a first and at least a second processing station, the robot is preferably configured to introduce the end section of the web-shaped packaging material into each processing station of the plurality of processing stations.

The robot is preferably configured to move the handling device at least horizontally and vertically through the packaging machine. The robot can preferably also rotate the handling device around a longitudinal axis of the holder. This movement, however, can also be made possible by a separate drive and a rotatable support of the holder on a different component of the handling device. The robot can, for example, be configured as a multi-axis robot or as a portal robot.

The configuration and reach of the robot depend essentially on the dimensions of the packaging machine and on the tasks which the robot must perform. If, for example, the robot guides the free end section of the web-shaped packaging material from a supply roll of the packaging material merely into one or more directly adjacent processing stations, it can be sufficient for the robot to be stationary. This is also the case when the packaging machine is relatively small or all of the processing stations are located within the conventional reach of the robot.

It is especially preferred, however, that the robot be able to move along the packaging machine. Thus the robot can be used even in relatively large packaging machines and/or can absorb greater loads, because the leverage forces are reduced when the distance by which the robot's arm must be extended is decreased.

The robot is preferably movable along the packaging machine in a direction which is defined from the entrance area of the packaging machine to the output area of the packaging machine and which is preferably horizontal.

That the robot is movable means that the entire robot together with its base can be moved as a unit along the packaging machine. So that this can be realized with the greatest possible simplicity, the robot is preferably movable in a linear manner.

According to another aspect of the disclosure, a method for inserting a non-rigid, web-shaped packaging material into a packaging machine comprises the following steps:
  providing the web-shaped packaging material;
  gripping the web-shaped packaging material by means of a handling device, wherein a free end section of the web-shaped packaging material is arched in a transverse direction of the web-shaped packaging material and projects out beyond the handling device; and
  introducing the free end section of the web-shaped packaging material into a first processing station of the packaging machine by means of the handling device.

As a result of the arching of the packaging material in the transverse direction of the web-shaped packaging material, a tensile force and a resulting tension are generated in the packaging material. This arching of the packaging material, i.e., the tensile force and tension in the packaging material, gives the packaging material a certain stability and stiffness. As a result of this effect, when the free end section of the packaging material is now gripped by the handling device, the end section projects from the handling device in the longitudinal direction of the packaging material. The projecting end section of the packaging material can then be easily introduced by the handling device into a processing station of the packaging machine no matter how the processing station is oriented.

Because the method makes it possible to introduce the web-shaped packaging material into a processing station of a packaging machine, it is possible to realize a (partial) automation of the insertion of the non-rigid, web-shaped packaging material into the packaging machine.

Here again it is obvious that the "first" processing station can be any desired processing station of a plurality of processing stations, or it can also be provided as the only processing station.

The handling device is preferably configured as described above and/or the packaging machine is provided with a handling device as previously described. All of the features, functions, and actions described in conjunction with the handling device and the packaging machine are consequently transferable analogously to the method and/or can be formulated as method steps.

The method steps described and claimed herein are preferably executed in the individual sequences given.

Providing the web-shaped packaging material is preferably accomplished in an entrance area of the packaging machine and comprises, for example, providing the packaging material on a supply roll or introducing a web of the packaging material into the packaging machine.

The method can also comprise providing, in a corresponding manner, an additional web-shaped packaging material in addition to the web-shaped packaging material, as previously described in particular in conjunction with the packaging machine. The method or its steps can then be carried out analogously for each web-shaped packaging material. In particular, the web-shaped packaging material and the additional web-shaped packaging material can consist of a forming film web and a lidding film web.

In an especially preferred embodiment, the method comprises guiding the web-shaped packaging material along a predetermined path through the packaging machine by means of the handling device. The guiding of the web-shaped packaging material through the packaging machine preferably comprises guiding the web-shaped packaging material around guide and deflection elements arranged along the predetermined path and introducing the web-shaped packaging material into at least one processing station arranged along the predetermined path. It is especially preferred that the web-shaped packaging material be guided around all of the guide and deflection elements and introduced into all of the processing stations of the packaging machine.

It is advantageous for the method to contain the following additional steps:
  gripping the introduced end section of the web-shaped packaging material by the first processing station after the free end section of the web-shaped packaging material has been introduced into the first processing station;

releasing the free end section of the web-shaped packaging material by the handling device upstream from the first processing station after the free end section has been gripped by the first processing station;

guiding the web-shaped packaging material through the first processing station; and gripping the free end section of the web-shaped packaging material again by means of the handling device downstream from the first processing station.

The web-shaped packaging material is thus introduced up to and into the processing station, which then grips the end section of the packaging material.

The handling device can then release the packaging material and be moved around the processing station so that it can grip the free end section of the web-shaped packaging material again downstream from the processing station. This is advantageous especially when the processing station is closed off vis-à-vis the handling device or cannot be opened (far enough) to make it possible for the handling device or the holder to pass through the processing station.

The gripping of the end section of the web-shaped packaging material by the first processing station can comprise clamping the packaging material in the first processing station by means of, for example, a roller feed. The web-shaped packaging material is then secured in the first processing station, so it cannot be pulled out of the first processing station after it has been released by the handling device.

The first processing station and possibly each of the plurality of processing stations comprise a pass-through direction, in which the web-shaped packaging material is guided through the individual processing station in question. The terms "upstream" and "downstream" of the processing station then refer to the associated pass-through direction.

The first processing station can comprise at least one guide and at least one feed device such as a roller feed. The guiding of the web-shaped packaging material through the first processing station can be accomplished by the at least one guide and the at least one feed device. The web-shaped packaging material is then pulled in by the processing station and guided through it unit the free end section emerges from the other end of the processing station.

It is also conceivable, however, that the free end section of the web-shaped packaging material could be inserted into the first processing station to such an extent that it emerges from the other end of the processing station already.

The guiding of the material through the processing station can also occur in steps, e.g., in that the handling device, after releasing the free end section of the web-shaped packaging material, re-grips the web-shaped packaging once or several times at a point a greater distance away from the processing station, then pushes the web-shaped packaging material farther along into the processing station, and finally releases it again. While the handling device is gripping the packaging material and pushing it along, the processing station releases the packaging material, e.g., in that it loosens the clamp or moves the feed element along as appropriate.

Finally, the handling device can be moved around the first processing station in order to re-grip the free end section.

The re-gripping of the free end section of the web-shaped packaging material downstream from the first packaging station is preferably accomplished in the same way as the original gripping of the free end section, wherein in particular the free end section of the web-shaped packaging material is arched in the transverse direction of the web-shaped packaging material and projects out from the handling device.

According to an alternative embodiment, the method can comprise the joint guiding-of the free end section of the web-shaped packaging material and the handling device through the first processing station. In this case, it is not necessary for the handling device to release the end section of the web-shaped packaging material and for the device to move around the processing station.

Instead, the joint guiding comprises the introduction of the free end section of the web-shaped packaging material into the first processing station by the handling device and the joint moving of the free end section of the web-shaped packaging material and the handling device, in particular the holder, through the first processing station. As a result, the gripping of the web-shaped packaging material by the processing station and the releasing and re-gripping of the web-shaped packaging material by the handling device can be omitted, as a result of which the method becomes more reliable and less susceptible to error.

This variant can be employed advantageously when the first processing station is open on the side facing the handling device or can be opened on the side facing the handling device and when the tools, feed devices, guides, and/or deflection elements of the first processing station can be opened to such an extent that the handling device or the holder can be moved through.

The method also preferably comprises opening the first processing station before the free end section of the web-shaped packaging material and the handling device are guided jointly through and closing of the first processing station after they have been guided jointly through.

As previously described, the packaging machine preferably comprises a plurality of processing stations, which comprise the first processing station and at least one second processing station. The method preferably comprises in this case the introduction of the free end section of the web-shaped packaging material into each processing station of the plurality of processing stations. As a result, the method can be further simplified and automated.

The guiding-through of the web-shaped packaging material through an individual processing station of the plurality of processing stations can be accomplished in accordance with one of the previously described variants. Thus, depending on the configuration of the individual processing station, it is possible to select a favorable way of introducing the packaging material into the processing station and of conducting it through the station in the individual case. More precisely, depending on the configuration of the individual processing station of the plurality of processing stations, the introduced end section of the web-shaped packaging material is gripped by the individual processing station in question, released by the handling device upstream from the processing station in question, guided through the processing station in question, and re-gripped by the handling device again downstream from the processing station in question; or the introduced end section of the web-shaped packaging material can be guided jointly with the handling device through processing station in question.

If the handling device is a handling device as described before or if the packaging machine comprises a handling device as described before, the method preferably comprises the step of:

rolling the holder over a surface of the web-shaped packaging material in the transverse direction of the web-shaped packaging material along the curvature of the contact area.

By rolling the holder over the surface of the packaging material, the object is achieved that the holder grips the packaging material in as clean and wrinkle-free a manner as possible and in particular generates a tensile force in the packaging material in the transverse direction of the packaging material.

That the holder "rolls" along the surface of the web-shaped packaging material means that the contact area of the holder first grips the packaging material in a first end part of the contact area of the holder and then grips the packaging material increasingly farther along the curvature of the contact area until it reaches a second end part of the contact area of the holder, wherein the second end part is arranged opposite the first end part in the longitudinal direction of the holder. Preferably the first end part of the contact area is arranged at a first end of the holder, and the second end part of the contact area is arranged at a second end of the holder.

If the holder is configured as a suction unit, this means that, with respect to the longitudinal direction of the holder, one suction cup after the other or one bore after the other grips the packaging material in succession. The method therefore preferably comprises the successive gripping of the free end section of the web-shaped packaging material by a plurality of suction cups or bores.

Finally, the step of gripping the web-shaped packaging material by means of the handling device preferably comprises the generating of a tensile force in the web-shaped packaging material in the transverse direction of the web-shaped packaging material and thus preferably parallel to the longitudinal direction of the holder.

For all of the embodiments described herein, it applies that the tensile force is preferably at least 15 N, more preferably at least 45 N, and even more preferably at least 65 N, in order to bring about a sufficient stability of the end section of the web-shaped packaging material projecting beyond the holder and to overcome resistances such as frictional resistances and the inertia of the supply roll and the deflecting elements.

It is also preferred that the tensile force not exceed 150 N, more preferably not exceed 100 N, even more preferably not exceed 80 N so as not to damage the packaging material.

The web-shaped packaging material is preferably very thin. That is, a thickness of the packaging material perpendicular to the longitudinal direction and perpendicular to the transverse direction of the packaging material is negligibly small in relation to the length of the packaging material in the longitudinal direction and to the width of the packaging material in the transverse direction.

For example, the thickness of the packaging material is less than 3 mm, preferably less than 2 mm, more preferably less than 1 mm. The width of the packaging material is, for example, between 0.01 m and 1 m, preferably between 0.02 and 0.5 m, more preferably between 0.02 m and 0.2 m. The length of the packaging material is preferably between 1 m and 10,000 m, more preferably between 2 m and 5,000 m, and even more preferably between 5 m and 2,000 m.

The tensile force in the web-shaped packaging material thus acts in the transverse direction of the web-shaped packaging material parallel to the arched to surface of the web-shaped packaging material. The tensile force is preferably generated by the rolling of the holder along the top surface of the web-shaped packaging material as the packaging material is being gripped by the handling device.

DETAILED DESCRIPTION

Figure 1:
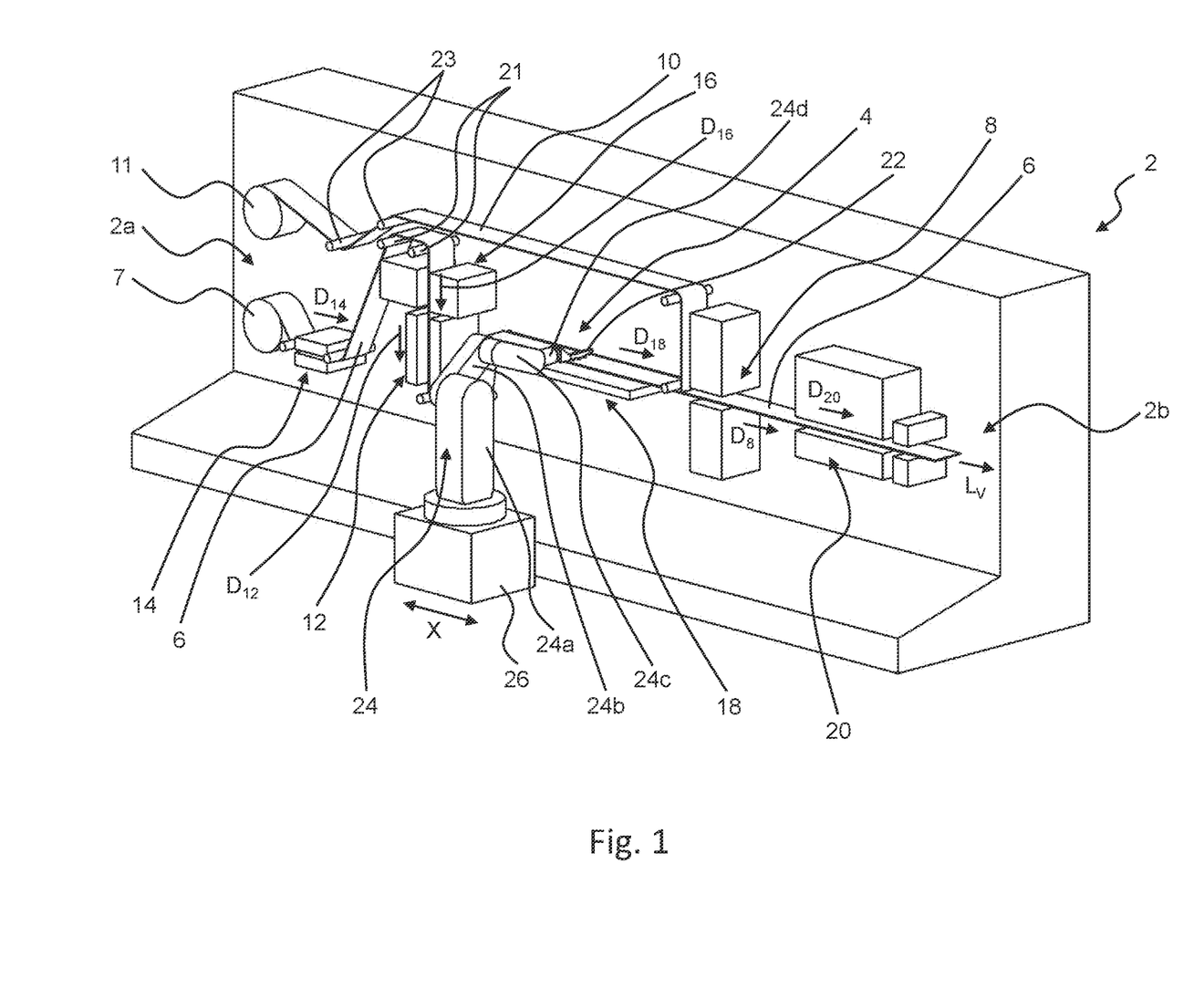
FIG. 1 shows a schematic view, in perspective, of an embodiment of a packaging machine according to the disclosure.

FIG. 1 shows a perspective view of a packaging machine 2 with a handling device 4 according to an aspect of the disclosure. In the embodiment shown, the packaging machine 2 is configured as a blister pack machine as an especially preferred example, but the following description is not to be limited to such a machine.

The packaging machine 2 is equipped with a non-rigid, web-shaped packaging material 6, which can consist here of a forming film web, and comprises at least one first processing station 8 for processing the web-shaped packaging material 6 in the packaging machine 2. The web-shaped packaging material 6 can be provided, for example, on a supply roll 7 in the entrance area 2*a* of the packaging machine 2. The web-shaped packaging material 6 has a longitudinal direction LV.

In addition to the web-shaped packaging material 6, the packaging machine 2 can also be equipped with another web-shaped packaging material 10, which can consist here of a lidding film web. The additional web-shaped packaging material 10 is also provided on a supply roll 11 in the entrance area 2*a* of the packaging machine 2.

The packaging machine 2 preferably comprises a plurality of processing stations; these stations include the first processing station 8 and at least one second processing station 12. They are configured to process the web-shaped packaging material 6 and, in the present case, the additional web-shaped packaging material 10 as well.

The plurality of processing stations comprises, for example, a cutting and pasting device 14 for joining successive material webs of the packaging material 6; a heating device 16 for heating the web-shaped packaging material 6; the second processing station 12, which is configured here, for example, as a forming device for forming pockets in the web-shaped packaging material 6; a filling device 18 for filling the pockets with medicinal or pharmaceutical products; the first processing station 8, which is configured here, for example, as a sealing device for sealing the lidding film web onto the forming film web; and a stamping device 20 for stamping out individual blister packs.

For the processing of the additional web-shaped packaging material 10, the packaging machine 2 can also comprise a plurality of processing stations, which include, for example, the first processing station 8 and the stamping device 20. Each processing station of the plurality of processing stations 8, 12, 14, 16, 18, 20 comprises a guide-through direction, in which the packaging material 6, 10 in question passes through processing station and which is characterized in each case by the reference number of the processing station in question plus the arrow D. It is obvious that the packaging machine can in principle have any desired number of processing stations, and the first and second processing stations 8, 12 are not limited to the examples indicated in FIG. 1.

In the illustrated state, the web-shaped packaging material 6 has already been fully inserted through the packaging machine 2. That is, the web-shaped packaging material 6 has been guided through all the necessary processing stations 8, 12, 14, 16, 18, 20 and around all of the necessary guide and deflection elements 21. The additional web-shaped packaging material 10 has also been completely inserted through the packaging machine 2 and guided through the necessary processing stations 8, 20 and around the necessary guide and deflection elements 23.

So that the insertion of the web-shaped packaging material 6, 10 can be at least partially automated, the handling device 4 is configured to insert a free end section (see FIG. 3) of the web-shaped packaging material 6, 10 into the first processing station 8 and, if desired, into additional processing stations of the plurality of processing stations 12, 14, 16, 18, 20. For this purpose, the handling device 4 comprises a holder 22, which is configured to grip the web-shaped packaging material 6, 10 and which is described in greater detail below with reference to FIGS. 2-4.

It is also advantageous for the packaging machine 2 to comprise a robot 24, which carries the handling device 4, which is supported on the robot 24. The robot 24 has the ability to guide the handling device 4 together with the holder 22 through the packaging machine 2 along a predetermined path for the web-shaped packaging material 6, 10 and to move the holder 22 as needed. If the robot 24 is intended to cover only certain areas of the packaging machine 2 which are within the reach of its arms 24a-d, the robot 24 can be stationary. Preferably, however, the robot 24 is movable along the packaging machine 2, in particular movable in linear fashion, as indicated in FIG. 1 by the arrow X. For example, a base 26, which carries the entire robot 24, can be movably supported for this purpose. The area over which the robot 24 can move preferably extends along the packaging machine 2 over such a distance that its reach covers the entire packaging machine between its entrance area 2a and its output area 2b. It is especially advantageous for at least the plurality of processing stations 8, 12, 14, 16, 18, 20 to lie within the reach of the robot 24.

Figure 2:
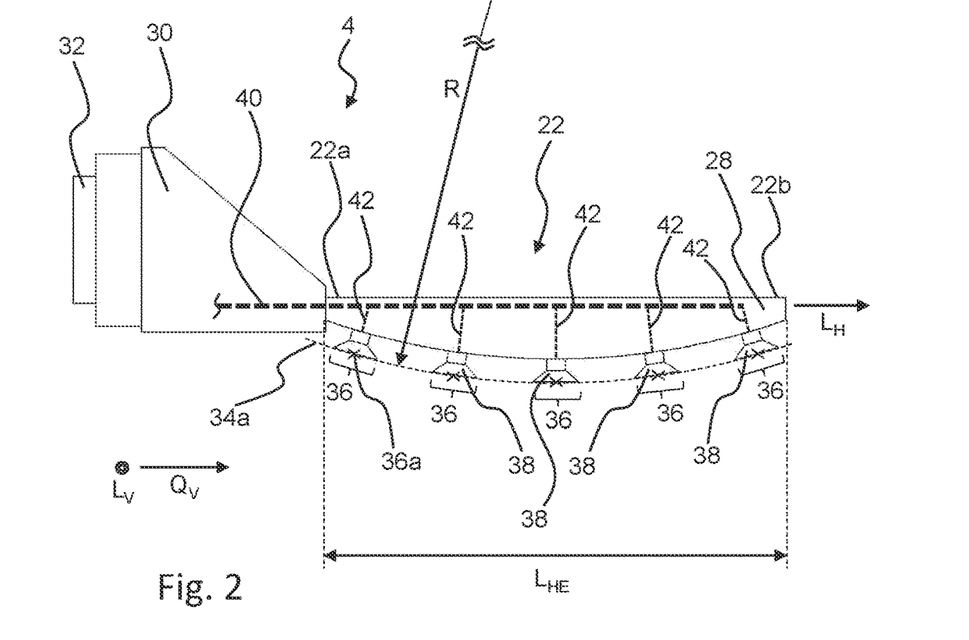
FIG. 2 shows a side view of a holder of the handling device of the packaging machine of FIG. 1.
Figure 3:
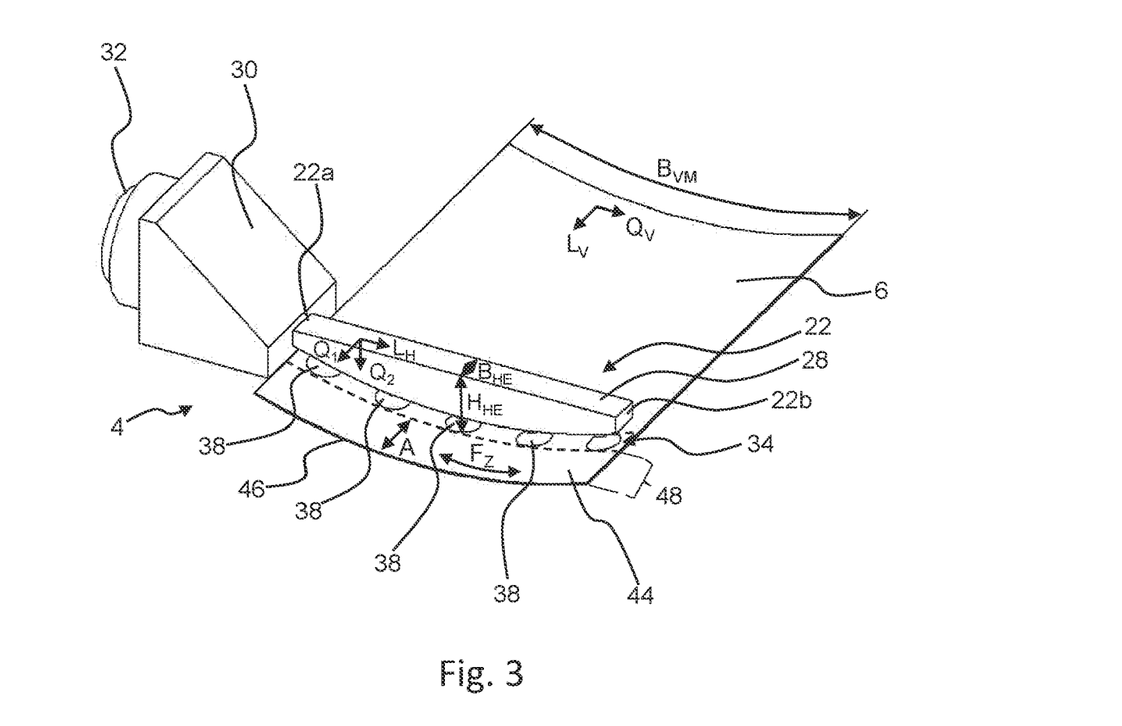
FIG. 3 shows a perspective view of the holder of FIG. 2.

The handling device 4 with the holder 22 is shown in a side view in FIG. 2 and in a perspective view in FIG. 3, wherein, in FIG. 3, part of the web-shaped packaging material 6 can also be seen. It is obvious that the explanations here also pertain analogously to an additional web-shaped packaging material 10 gripped by the holder.

The holder 22 extends farther in a longitudinal direction LH of the holder 22 than in the transverse directions Q1, Q2 of the holder 22. The transverse directions Q1, Q2 of the holder 22 are perpendicular to the longitudinal direction LH of the holder 22 and perpendicular to each other. The holder 22 preferably comprises a substantially rod-shaped or tube-shaped body 28, which extends appropriately farther in the longitudinal direction LH of the holder 22 than in the transverse directions Q1, Q2 of the holder 22. A length LHE of the holder 22 is defined in the longitudinal direction LH of the holder 22 from the first end 22a to the second end 22b. A width BHE of the holder 22 is defined as being parallel to the transverse direction Q1, and a height HHE is defined as being parallel to the transverse direction Q2. For the width BHE and the height HHE, the determining factor is the maximum dimension of the holder 22 oriented in the corresponding direction.

The body 28 of the holder 22 can extend out in the longitudinal direction LH from a housing 30 of the handling device 4; the housing can hold, for example, a control unit and a media supply unit. In the exemplary embodiment shown here, the holder 22 comprises a first end 22a and a second end 22b, which is opposite the first end 22a in the longitudinal direction LH. The first end 22a is preferably permanently connected to the housing 30, whereas the second end 22b forms a free end of the holder 22.

The handling device 4 also comprises a coupling 32, so that the handling device 4 can be connected to a complementary coupling on the robot 24, in particular to a free end of a robot arm 24d. The coupling 32 of the handling device 4 and the complementary coupling on the robot 24 preferably form a quick-change system.

The holder 22 also comprises a contact area 34, which is defined by at least one contact site 36 for contacting the web-shaped packaging material 6. The contact area 34 also comprises a curvature in the longitudinal direction LH; this curvature preferably extends over the entire contact area 34 in the longitudinal direction LH of the holder 22. That is, the contact area 34 is curved in its entirety.

The holder 22 can comprise a plurality of point-like contact sites (contact points) for the web-shaped packaging material 6; these points define the contact area 34 and lie, in a cross-sectional view parallel to the longitudinal direction LH of the holder 22 and perpendicular to the longitudinal direction LV of the packaging material 6, along a curved line corresponding to the curvature of the contact area 34. This is indicated in FIG. 2 by contact points, one of which is identified by the reference number 36a, as a representative, and which lie on the dashed curved line 34a.

The holder 22 can also comprise a linear contact (contact line) with the web-shaped packaging material 6, which then comprises the corresponding curvature indicated in the previously defined cross-sectional view. The same applies analogously to a 2-dimensional contact (contact area) with the web-shaped packaging material. A linear or 2-dimensional contact can extend continuously along the contact area 34 or, as shown here, it can be formed by multiple contact sites 36.

In the embodiment shown, the holder 22 comprises a plurality of contact sites 36, each of which can have a linear or 2-dimensional configuration; here they are ring-shaped and are spaced a certain distance apart in the longitudinal direction LH of the holder 22. In the previously defined cross-sectional view, the plurality of contact sites 36 lie on the curved line 34a corresponding to the curvature of the contact area 34.

The curvature of the contact area 34, which is indicated in FIG. 2 by the broken line 34a, can be defined by a quadratic function or be formed by a segment of a circle. A radius of curvature R is indicated correspondingly for the curved line 34a in FIG. 2.

In the embodiment shown in FIGS. 2-4, the holder 22 is configured as a suction unit. This is especially suitable for handling sensitive packaging materials such as films; it can be easily activated and deactivated for gripping and releasing the packaging material; and it has a space-saving structure.

The suction unit can comprise a plurality of suction cups 38, which are preferably arranged one after the other in the longitudinal direction LH of the holder 22. The suction cups 38 can be actuatable independently of each other, individually or in groups; for example, each one can be connected fluidically by its own separate line to a source of negative pressure such as a vacuum pump. The suction cups 38, however, can also all be connected to a vacuum line 40 in the interior of the holder 22, as indicated schematically in FIG. 2. For this purpose, a plurality of bores 42 can be provided in the holder 22, these bores serving to connect the suction cups 38 via the vacuum line 40 to the negative pressure source.

As can be seen in FIG. 3, the holder 22 grips a free end section 44 of the web-shaped packaging material 6. The free end section 44 of the web-shaped packaging material 6 has a leading edge 46, which is transverse to the longitudinal direction LV of the web-shaped packaging material 6. The width of the web-shaped packaging material is indicated in FIG. 3 by the reference symbol BVM.

Once the holder 22 has engaged the free end section 44 of the web-shaped packaging material 6, the longitudinal direction LH of the holder 22 is perpendicular to the longitudinal direction LV of the web-shaped packaging material 6 and parallel to the transverse direction QV of the web-shaped packaging material 6.

As can be seen, the curvature of the contact area 34 of the holder 22 has the effect that the web-shaped packaging material 6 gripped by the holder 22 is arched in the transverse direction QV of the packaging material 6 in correspondence with the curvature of the contact area 34. As a result, a tensile force is generated in the web-shaped packaging material 6; this force is indicated in FIG. 3 by the arrow FZ and is oriented transversely to the longitudinal direction LV along the curvature or arching.

The tensile force FZ has in turn a certain stabilizing effect on the free end section 44 of the web-shaped packaging material 6, as a result of which the object is achieved that the free end section 44 projects out from the holder 22 in the longitudinal direction LV and does not hang downward under the force of gravity. The part of the free end section 44 of the web-shaped packaging material 6 projecting from the holder 22 is also referred to as the overhang 48. This overhang 48 can now be introduced by means of the handling device 4 into at least one processing station of the plurality of processing stations 8, 12, 14, 16, 18, 20.

A distance A is defined between the leading edge 46 of the web-shaped packaging material 6 and the holder 22, parallel to the longitudinal direction LV of the web-shaped packaging material 6. This distance A specifies the size of the overhang 48. The greater the curvature of the contact area 34 and thus the greater the arching of the web-shaped packaging material 6 in the free end section 44, i.e., the greater the tensile force FZ, the greater the distance A can be, because this force is associated with a greater stability of the free end section 44 and thus of the overhang 48.

The method for inserting the non-rigid, web-shaped packaging material 6 into the packaging machine 2 is described below with reference to FIGS. 1-6. The method comprises, first, the providing of the web-shaped packaging material 6, preferably on the supply roll 7, in the entrance area 2a of the packaging machine 2 (see FIG. 1).

This is followed by the gripping of the web-shaped packaging material 6 by the handling device 4, preferably at the supply roll 7 initially, wherein the free end section 44 of the web-shaped packaging material 6 is arched in the transverse direction QV of the web-shaped packaging material 6 and projects from the handling device 4, as shown in FIG. 3. This is achieved in particular in that the free end section 44 of the web-shaped packaging material 6 is gripped by the holder 22, the contact area 34 of which has a curvature as described with reference to FIGS. 2 and 3.

Figure 4A:
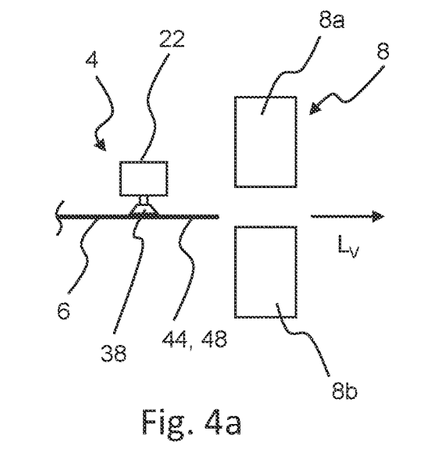
FIGS. 4*a*-4*d* show schematic side views of the steps of an embodiment of the method according to the disclosure.
Figure 4B:
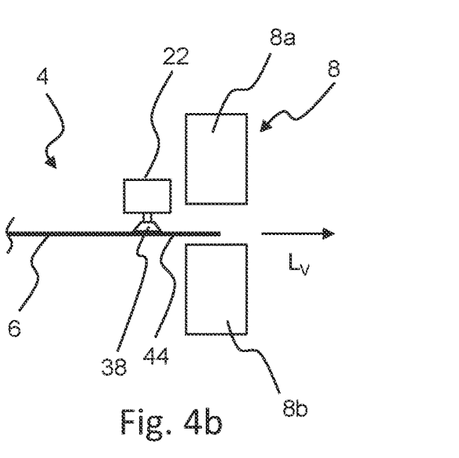
Figure 5A:
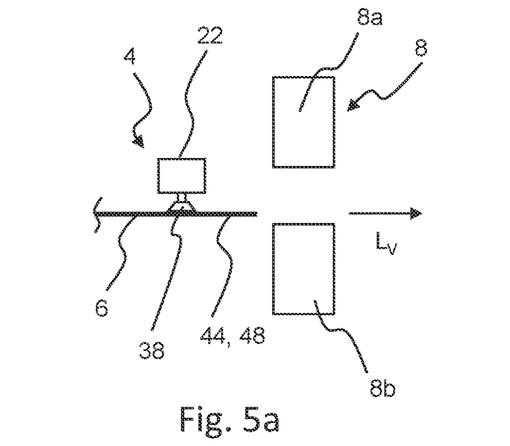
FIGS. 5*a*-5*b* show schematic side views of the steps of the method.
Figure 5B:
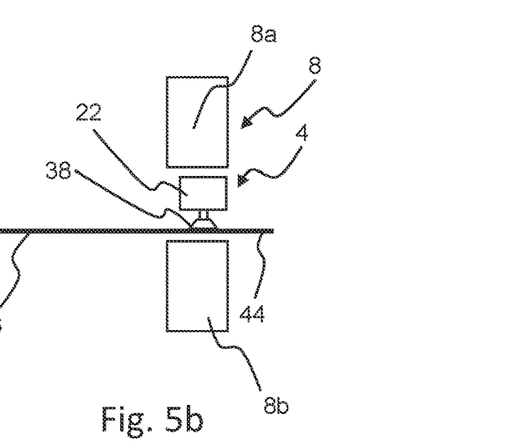

The gripped free end section 44 of the web-shaped packaging material 6 is then guided by the handling device 4 up to at least the first processing station 8 of the packaging machine 2, as shown in FIGS. 4a and 5a, and then introduced into the first processing station 8 (see FIG. 4b, FIG. 5b). For example, the free end section 44 is introduced into a gap between an upper and a lower die 8a, 8b of the first processing station 8. It is especially advantageous that the overhang 48 of the free end section 44 projects in stable fashion from the holder 22 and thus can be easily introduced into the first processing station 8.

According to the embodiment shown in FIGS. 5a and 5b, the handling device 4, in particular its holder 22, and the free end section 44 of the web-shaped packaging material 6 can be guided jointly through the first processing station 8 and possibly, after the free end section 44 has been introduced into the processing station in question (see FIG. 5a), through additional processing stations of the plurality of processing stations (see FIG. 5b). This is possible when the processing station in question has opened up sufficiently or when there is in any case enough room to allow the holder 22 to pass through.

Figure 4C:
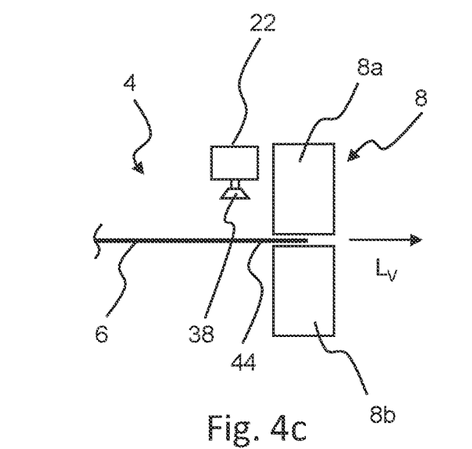
Figure 4D:
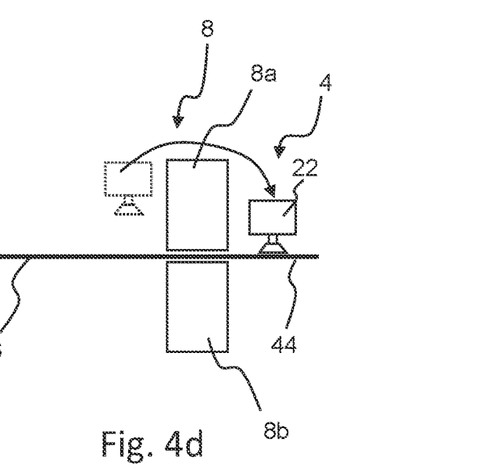

In particular when this is not the case, it is preferred, as shown in FIGS. 4a-4c, for the end section 44 of the web-shaped packaging material 6 already introduced as shown in FIG. 4b to be gripped by the processing station in question and then released by the handling device 4, as shown in FIG. 4c. For example, the free end section 44 is for this purpose clamped by the upper and lower dies 8a, 8b. Then only the web-shaped packaging material 6 is guided through the processing station, while the handling device 4 can be moved around the first processing station 8, as indicated in FIG. 4d. Downstream from the first processing station 8, the handling device 4 then grips the free end section 44 of the web-shaped packaging material 6 again (FIG. 4d).

Figure 6A:
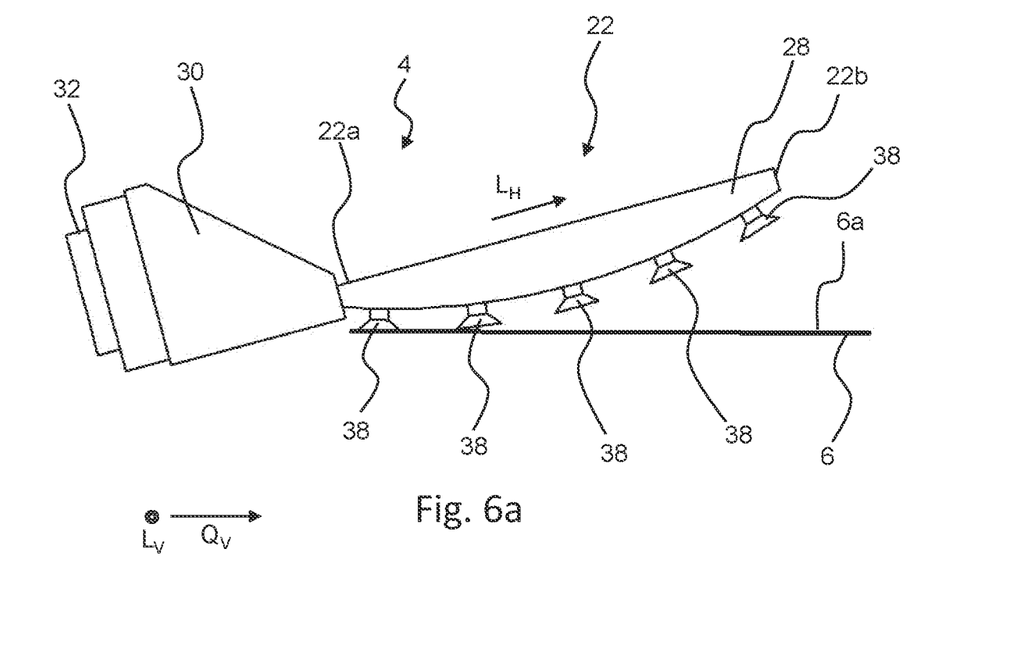
FIGS. 6*a*-6*c* show schematic side views of the rolling of a holder according to FIG. 2 along a web-shaped packaging material.
Figure 6B:
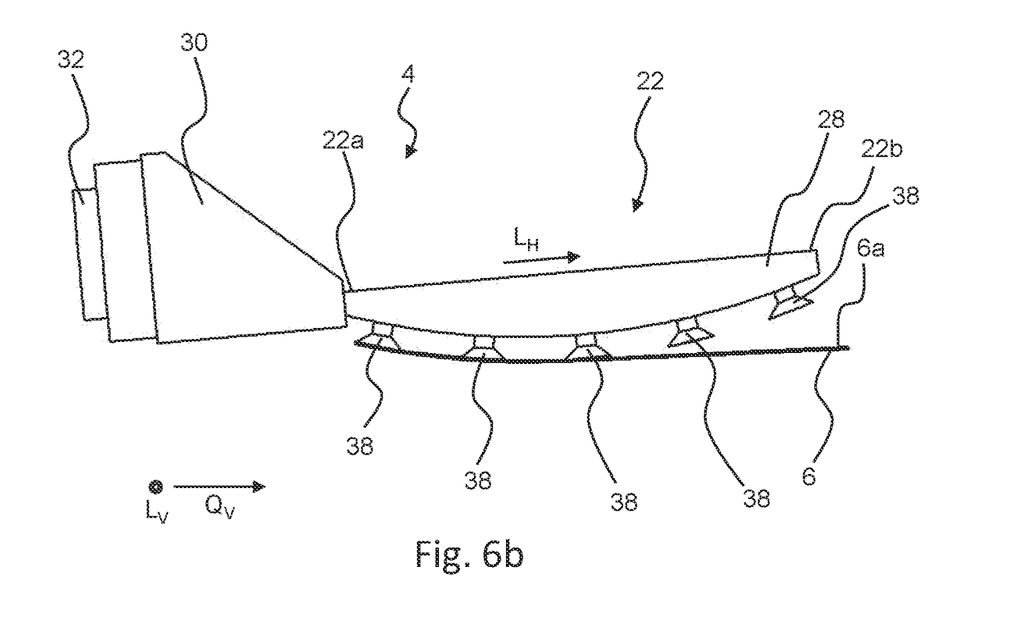
Figure 6C:
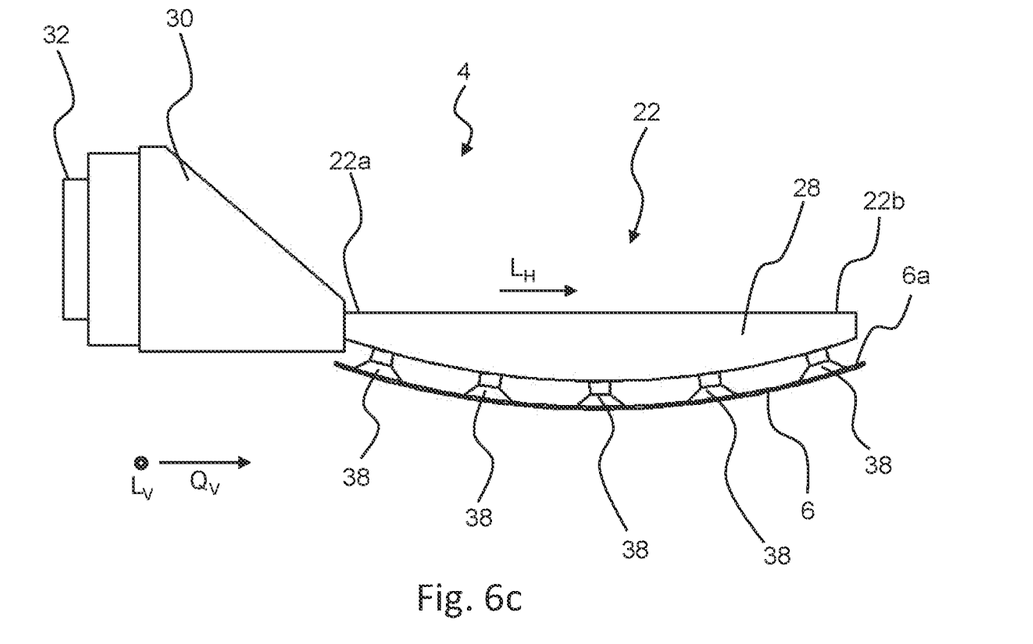

The gripping of the web-shaped packaging material 6 by the holder 22 of the handling device 4 is described in greater detail on the basis of FIGS. 6a-6c. In this preferred embodiment, the gripping of the web-shaped packaging material 6 by means of the handling device 4 comprises the rolling of the holder 22 along a surface 6a of the web-shaped packaging material 6 in the transverse direction QV of the web-shaped packaging material 6 along the curvature of the contact area 34. As a result, the goal is achieved that the web-shaped packaging material 6 is gripped cleanly and wrinkle-free, and a well-defined tensile force FZ is generated in the web-shaped packaging material 6.

As a result of the rolling action, the contact area 34 of the holder 22 first grips the packaging material 6 in the area of the first end 22a of the holder 22 (see FIG. 6a), and then, as the rolling proceeds along the curvature of the contact area 34, it reaches the area of the second end 22b of the holder 22 (see FIG. 6c).

If the holder 22 is configured as a suction unit, as illustrated, this means that one suction 38 after the other grips the web-shaped packaging material 6 in the longitudinal direction LH of the holder 22. Thus, in FIG. 6a, a suction cup 38 of the plurality of suction cups 38 first grips the web-shaped packaging material 6 close to the first end 22a of the holder 22. The suction cup 38 coming next in the longitudinal direction LH of the holder 22 can thus already be in a position very close to the surface 6a of the web-shaped packaging material. As can be seen in FIG. 6b, the holder 22 has rolled farther along the surface 6a, so that, in the state shown, the two next suction cups 38 are in engagement with the web-shaped packaging material 6. It can already be seen that the web-shaped packaging material 6 has become arched between the suction cups 38 which have already gripped the packaging material 6.

Through the continuation of the rolling process, the remaining suction cups 38 become engaged with the web-shaped packaging material 6, as shown in FIG. 6c. In this state, the holder 22 has gripped the web-shaped packaging material 6 completely, and the material has become arched all the way along curvature of the contact area 34. FIGS. 3 and 6c show different views of the same state of the web-shaped packaging material 6 gripped by the holder 22.

It is obvious that the steps described in conjunction with the holder 22 can also be transferred analogously to other holders which have a curved contact area for gripping the web-shaped packaging material. Similarly, the method steps described here apply analogously to the handling of the additional web-shaped packaging material 10. Because the method is preferably implemented by a handling device 4 or a packaging machine 2 which comprises such a handling device, all of the features described in conjunction with the handling device 4 and the packaging machine 2 can be transferred analogously to the method and vice versa.

The invention claimed is:

1. A packaging machine comprising:
a web-shaped packaging material, which extends farther in a longitudinal direction of the packaging material than in a transverse direction of the packaging material;
a first processing station for processing the packaging material in the packaging machine; and
a handling device for handling the packaging material and for inserting a free end section of the packaging material into the first processing station;
wherein the handling device comprises a holder configured to grip the packaging material, wherein the holder is in engagement at least temporarily with the free end section of the packaging material;
wherein the holder extends farther in a longitudinal direction of the holder than in two transverse directions of the holder, wherein the two transverse directions of the holder are perpendicular to each other and each of the two transverse directions of the holder is perpendicular to the longitudinal direction of the holder, and wherein the longitudinal direction of the holder is perpendicular to the longitudinal direction of the packaging material and parallel to the transverse direction of the packaging material;
wherein the holder has a contact area, which is defined by at least one contact site for contacting the packaging material, wherein the contact area has a curvature in the longitudinal direction of the holder.

2. The packaging machine of claim 1, wherein the curvature is defined by a quadratic function.

3. The packaging machine of claim 1, wherein the curvature has a radius of curvature which is between 1000 mm and 3000 mm.

4. The packaging machine of claim 1, wherein the holder is configured as a suction unit.

5. The packaging machine of claim 1, wherein the holder comprises a plurality of contact sites for contacting the packaging material.

6. The packaging machine of claim 1, wherein the contact area of the holder extends over at least 60% of a width of the packaging material in the transverse direction of the packaging material.

7. The packaging machine of claim 1, further comprising a robot, on which the handling device is supported, and which is configured to insert the free end section of the packaging material by means of the handling device into the first processing station.

8. The packaging machine of claim 7, wherein the robot is movable along the packaging machine.

9. A method for inserting a web-shaped packaging material into a packaging machine, comprising the steps of:
providing the packaging material;
gripping the packaging material by means of a handling device, wherein a free end section of the packaging material is arched in a transverse direction of the packaging material and projects out from the handling device, wherein the handling device comprises a holder, which is configured to grip the web-shaped packaging material, the holder extending farther in a longitudinal direction than in transverse directions perpendicular to the longitudinal direction of the holder and comprises a contact area, which is defined by at least one contact site for contacting the web-shaped packaging material, the contact area comprising a curvature extending in the longitudinal direction of the holder; and
inserting the free end section of the packaging material into a first processing station of the packaging machine by way of the handling device.

10. The method of claim 9, further comprising the steps of:
gripping the inserted end section of the packaging material by the first processing station after the free end section of the packaging material has been inserted into the first processing station;
releasing the free end section of the packaging material by the handling device upstream from the first processing station after the free end section has been gripped by the first processing station;
guiding the packaging material through the first processing station; and
regripping the free end section of the packaging material by way of the handling device downstream from the first processing station.

11. The method of claim 9, further comprising:
guiding the free end section of the packaging material and the handling device jointly through the first processing station.

12. The method of claim 9, wherein the packaging machine comprises a plurality of processing stations, which plurality comprises the first processing station and at least one second processing station, and wherein the method further comprises the step of inserting the free end section of the packaging material successively into each processing station of the plurality of processing stations.

13. The method of claim 9, wherein the handling device comprises a holder configured to grip the packaging material, wherein the step of gripping the packaging material by means of the handling device comprises rolling the holder over a surface of the packaging material in a transverse direction of the packaging material along a curvature of the holder.

14. The method of claim 9, wherein the step of gripping the packaging material by means of the handling device comprises the step of generating a tensile force in the packaging material in the transverse direction of the packaging material, wherein the tensile force is at least 15 N.

* * * * *